June 18, 1957  J. F. MAGGART  2,796,292
MOBILE PIPELINE SPRAY APPARATUS
Filed July 23, 1953  3 Sheets-Sheet 1

Joel F. Maggart
INVENTOR.

June 18, 1957　　　J. F. MAGGART　　　2,796,292
MOBILE PIPELINE SPRAY APPARATUS
Filed July 23, 1953　　　　　　　　　　　3 Sheets-Sheet 2
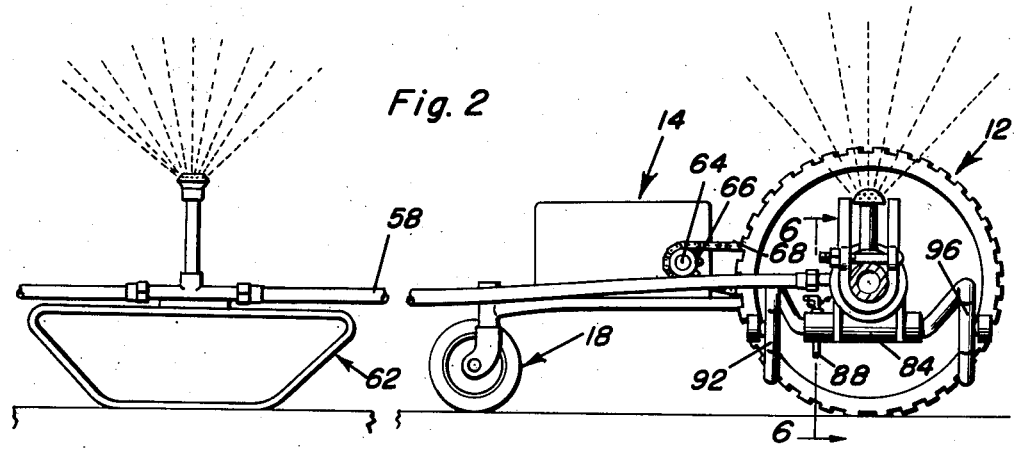
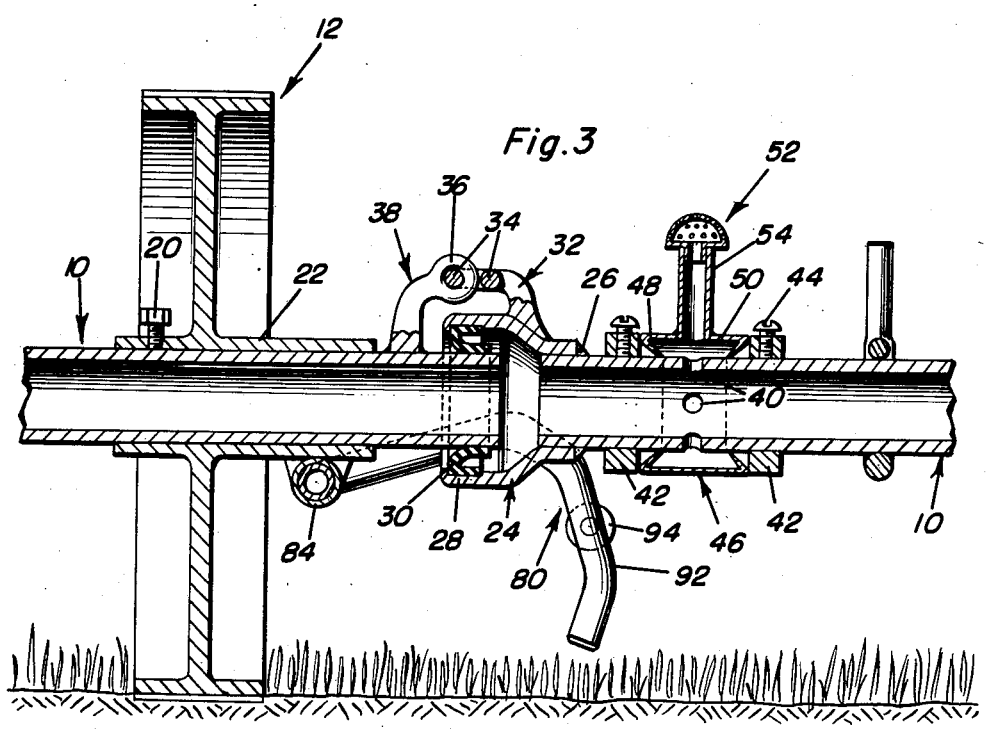
Joel F. Maggart
INVENTOR.

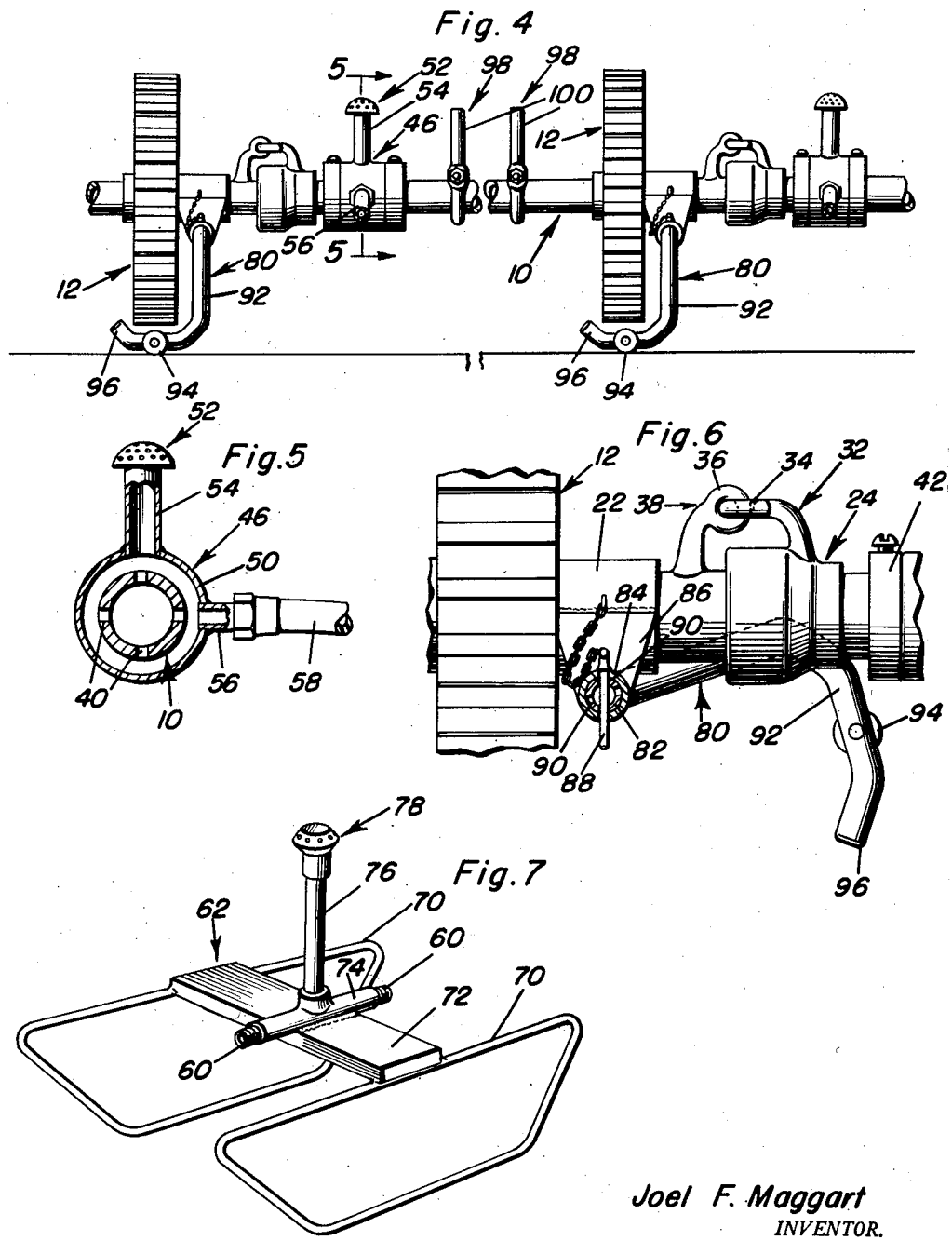

United States Patent Office 2,796,292
Patented June 18, 1957

2,796,292

MOBILE PIPELINE SPRAY APPARATUS

Joel F. Maggart, Porterville, Calif.

Application July 23, 1953, Serial No. 369,769

1 Claim. (Cl. 299—47)

This invention relates generally to spraying machines and pertains more particularly to apparatus for effecting the spraying or irrigation of fields and the like.

A primary object of this invention is to provide an improved form of spray apparatus which is extremely mobile for movement in both lateral and longitudinal directions for most effectively placing the apparatus for spraying operations.

Another object of this invention is to provide an improved form of spray apparatus of articulated construction so that the apparatus may conform most easily to the ground surface over which it is operating.

Another object of this invention is to provide an improved form of spray apparatus which includes a main body portion and other portions connected thereto in trailing relation for effecting a wide coverage for irrigation purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is an enlarged vertical section taken substantially along the plane of section line 2—2 of Figure 1;

Figure 3 is an enlarged longitudinal section taken substantially along the plane of section line 3—3 showing the manner of flexibly interconnecting the various pipe sections and showing details of one of the spray heads;

Figure 4 is an enlarged front elevation of a portion of the apparatus, showing the same in position for longitudinal movement;

Figure 5 is an enlarged vertical section taken substantially along the plane of section line 5—5 showing details of one of the spray heads;

Figure 6 is an enlarged elevational view of a portion of the machine; and

Figure 7 is a perspective view of one of the trailing spray heads.

Figure 1:
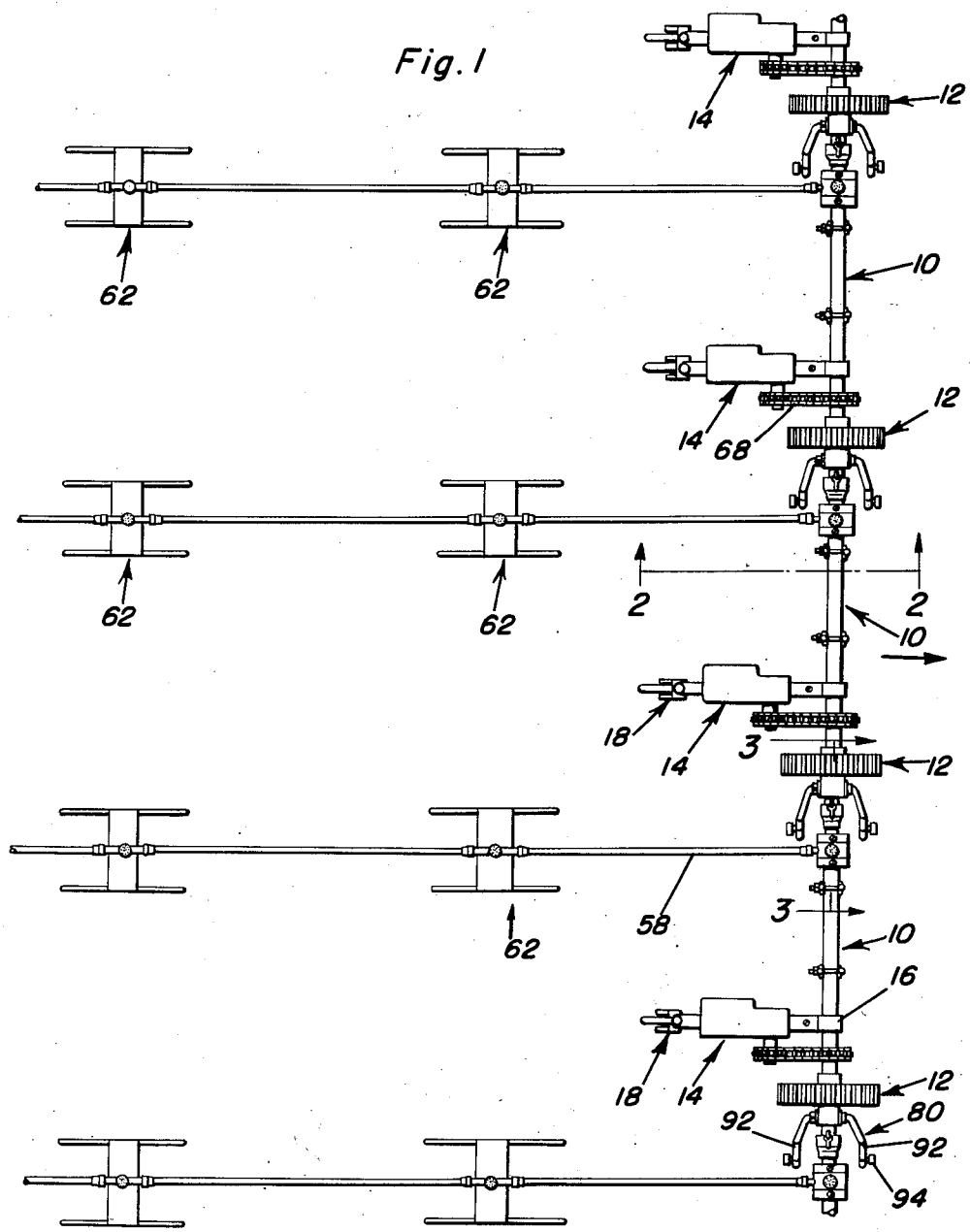
Figure 1 is a plan view of a portion of the apparatus constructed in accordance with this invention.

Referring now more particularly to the drawings, reference numeral 10 indicates generally the individual pipe sections forming the main supporting portion of the apparatus and reference numeral 12 indicates generally the wheel assemblies associated with each of the pipe sections for supporting the same for movement along the ground surface.

Reference numeral 14 indicates generally any suitable form of motive power unit which are rotatably secured as by the bearing brackets 16 to the pipe sections in trailing relation thereto and which are provided with the castor wheel assemblies indicated generally by the reference character 18 forming partial support for these units.

As seen more clearly in Figure 3, the wheel assemblies may be secured to the pipe sections as by the setscrew members 20, these setscrews extending through the hub portion 22 of the wheel. One end of each of the sections is provided with the sleeve member 24 which is rigidly secured thereto, as by welding 26 and the outer enlarged free end 28 of these coupling sleeves are disposed in enclosing relation to the corresponding end of the next pipe section and the resilient washer members 30 extend between the coupling sleeves and the adjacent pipe sections in sealing engagement therewith to prevent water within the pipe section from leaking outwardly at this point. Each sleeve is provided with a taut arm 32 whose free end terminates in an eye 34 which is linked with the eye 36 of the taut arm 38 suitably secured to the adjacent pipe section in the manner shown. In this manner, articulation is provided between adjacent pipe sections and it will be noted that the configuration of the resilient washer 30 is such as to permit the articulation necessary under uneven ground surface conditions so as to provide an effective seal at all times between adjacent pipe sections.

A portion of each pipe section is provided with the circumferentially spaced apertures 40 which are disposed between the stop collar 42 rigidly secured to the pipe section as by the setscrews 44 and which retains the sleeves or cylinder members 46 therebetween in journaled relation of the pipe sections. Opposite ends of the sleeves are inwardly deformed, as indicated by the reference character 48 to sealingly engage with the outer surface of each pipe section and the cylindrical wall 50 of the sleeves are disposed in spaced relation to the outer surface of the pipe sections so that a chamber is formed therebetween to receive water expressed from the apertures 40 in the sections. The spray head, indicated generally by the reference character 52, communicates with the sleeve chamber through the medium of the nipple 54 secured to the sleeve. Each sleeve is additionally provided with a nipple 56 disposed quadrantly of the nipple 54 and the nipples 56 are adapted to receive one end of the flexible conduit 58 whose other ends are secured to the threaded end 60 of the trailing spray needle, indicated generally by the reference character 62.

It will be manifest that as the drive unit 14 rotates the shaft 64 and their associated gears 66 which rotate the pipe sections through associated gears and chains 68, the pipe sections will rotate to cause a corresponding rotation of the wheel members 12 to effect movement of the apparatus along the ground surface. At the same time, the sleeve members 46 are prevented from rotating with the pipe sections by virtue of the fact that the drag created by the trailing spray vehicle 62 will prevent this rotation, thus maintaining the spray head 52 in proper vertical position.

As seen more clearly in Figure 7, each of the trailing spray vehicles includes the runner members 70 of closed, inverted trapezoidal configuration whose base members are interconnected by means of the cross bars 72 which carry the supply conduit 74, having the previously described threaded end 60 and which communicates with the upright nipple portion 76 terminating at their upper ends in the spray heads 78. It will be readily apparent that any number of trailing spray vehicles may be attached to the apparatus to effect as large an area of coverage as may be desired.

Referring now more particularly to Figures 4 and 6, it will be seen that generally J-shaped support members 80 are provided with laterally bent upper ends 82 which are pivotally received in the bosses 84 secured in depending relation and secured in radially spaced relation to the hub portion 22 of the wheel assemblies 12 by the radial bracket ears 86. The bosses 84 are provided with apertures through which the retaining pins 88 are projectable and the ends 82 of the supporting members are provided with circumferentially spaced pairs of holes 90 selectively registerable with the hole in the bosses 84 to retain the support members in either of the positions shown in Figure 4 or 6. It will be noted that the portions 82 of the support members interconnect the leg portions 92 thereof and that the free ends of each of the leg portions are provided with the rollers 94 so that when the apparatus is disposed in the position shown in Figure 4, the wheel 12 will be elevated above the surface of the ground so that the entire apparatus may be moved in a longitudinal direction by virtue of the engagement of the rollers 94 with the ground surface, it being noted that the free ends 96 of the legs 92 are upturned to prevent their digging in the ground. While the apparatus is thus being moved, the various trailing spray vehicles may be hung on the rack members, indicated generally by the reference character 98, which racks are of generally U-shaped configuration with their leg portions 100 extending upwardly of the pipe sections when the assembly is positioned as shown in Figure 4.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A spray apparatus comprising a plurality of pipe sections provided at spaced intervals with sprayheads, flexible couplings connecting said pipe sections together, each flexible coupling having one part attached to one section and another part attached to the adjacent section, arms secured to adjacent sections, means pivotally connecting said arms together for restricting the articulation of said sections at said couplings, wheels mounted on said sections for movably supporting said sections on the ground in one direction, means for supporting said sections for movement in another direction, the last-mentioned means including on each section a pair of support arms, an interconnecting member fixed to each of said arms, one arm of said pair being disposed on one side of said sections and the other arm of said pair being disposed on the opposite side of said sections, a bearing secured to one of said sections, said interconnecting member being mounted rotatably in said bearing, so that said arms are movable to a position beneath the last-mentioned section in order to elevate said sections and the adjacent wheel is lifted from the ground, and means operatively connected with said interconnecting member for releasably locking said interconnecting member.

References Cited in the file of this patent

UNITED STATES PATENTS

| | | |
|---|---|---|
| 1,076,555 | Dillon | Oct. 21, 1913 |
| 1,084,094 | Loosen | Jan. 13, 1914 |
| 1,127,508 | Pinckney | Feb. 9, 1915 |
| 1,499,851 | Brown | July 1, 1924 |
| 1,601,199 | Clapper | Sept. 28, 1926 |
| 2,174,600 | Schutmaat | Oct. 3, 1939 |
| 2,516,711 | Mansur | July 25, 1950 |
| 2,726,895 | Behlen | Dec. 13, 1955 |

FOREIGN PATENTS

| | | |
|---|---|---|
| 157,727 | Great Britain | Mar. 2, 1922 |
| 348,330 | Germany | Feb. 6, 1922 |